US007742175B2

(12) United States Patent
Fondeur et al.

(10) Patent No.: US 7,742,175 B2
(45) Date of Patent: Jun. 22, 2010

(54) METHOD OF ANALYZING A PRESENCE IN A SPACE

(75) Inventors: Jean-Christophe Fondeur, Levallois-Perret (FR); Laurent Lambert, Paris (FR); Gilles Monteilliet, Us (FR)

(73) Assignee: Sagem Securite, Paris (FR)

(*) Notice: Subject to any disclaimer, the term of this patent is extended or adjusted under 35 U.S.C. 154(b) by 138 days.

(21) Appl. No.: 11/921,673

(22) PCT Filed: Jun. 8, 2006

(86) PCT No.: PCT/FR2006/001295

§ 371 (c)(1),
(2), (4) Date: Dec. 6, 2007

(87) PCT Pub. No.: WO2006/131647

PCT Pub. Date: Dec. 14, 2006

(65) Prior Publication Data

US 2009/0128817 A1 May 21, 2009

(30) Foreign Application Priority Data

Jun. 8, 2005 (FR) .................................. 05 05810

(51) Int. Cl.
*G01B 11/24* (2006.01)

(52) U.S. Cl. ...................................................... 356/613

(58) Field of Classification Search .......... 356/600–640
See application file for complete search history.

(56) References Cited

U.S. PATENT DOCUMENTS

| | | | | |
|---|---|---|---|---|
| 3,758,723 | A * | 9/1973 | Green et al. | 378/98.2 |
| 4,171,161 | A * | 10/1979 | Jung | 356/634 |
| 4,695,130 | A * | 9/1987 | Medina et al. | 359/464 |
| 5,506,913 | A * | 4/1996 | Ibison et al. | 382/132 |
| 5,637,866 | A * | 6/1997 | Riener et al. | 250/229 |
| 5,742,749 | A * | 4/1998 | Foran et al. | 345/426 |
| 6,437,782 | B1 * | 8/2002 | Pieragostini et al. | 345/426 |
| 6,600,509 | B1 * | 7/2003 | Kent et al. | 348/143 |
| 7,530,690 | B2 * | 5/2009 | Divo et al. | 351/177 |
| 2005/0134588 | A1 * | 6/2005 | Aila et al. | 345/426 |

FOREIGN PATENT DOCUMENTS

| | | |
|---|---|---|
| EP | 0 448 803 A2 | 12/1990 |
| EP | 1 037 181 A2 | 9/2000 |

* cited by examiner

*Primary Examiner*—Gregory J Toatley, Jr.
*Assistant Examiner*—Jarreas C. Underwood
(74) *Attorney, Agent, or Firm*—Muncy, Geissler, Olds & Lowe, PLLC

(57) ABSTRACT

A method of analyzing a presence in a space (5), the method comprising the steps of:

projecting at least one light beam (10) into the space towards a screen in such a manner that at least a portion of a body, if present in the space, casts a shadow onto the screen; and analyzing the shadow cast on the screen.

5 Claims, 3 Drawing Sheets

METHOD OF ANALYZING A PRESENCE IN A SPACE

The present invention relates to a method of analyzing a presence in a space, the method being suitable for use in particular in automatic systems for controlling access to premises or for identifying people.

BACKGROUND OF THE INVENTION

In premises to which access is controlled, such as premises containing sensitive information or housing materials or articles that are dangerous or precious, it is becoming more and more frequent to make use of automatic systems for authorizing access, e.g. comprising an identification device that recognizes fingerprints or irises in order to verify whether people attempting to access the premises are entitled to have such access authorized. Such devices provide relatively reliable identification of people submitting themselves to inspection. Nevertheless, on their own such devices cannot prevent a fraudulent person who does not submit to identify checking from penetrating into the controlled-access premises together with some other person whose identity has been checked successfully.

To avoid that drawback, it is common practice to use turnstile-type barriers. Nevertheless, a fraudulent person can jump the barrier so the risk of that person gaining access is still quite high. In addition, that type of barrier restricts the flow of people and is not very practical for users carrying baggage or for people of reduced mobility such as elderly people or people with motor handicaps.

Access monitoring systems are known that use a camera and image processing software for automatically detecting the number of people attempting to access the monitored premises. Such image processing is complex, greedy in computer resources, and relatively lengthy. Furthermore, it is effective only if the person or people attempting to access the premises can be distinguished clearly from the background of the image for processing.

Proposals have been to use identification devices and monitoring systems in airports for monitoring passenger access to departure lounges. To do this, proposals have been made to place lock chambers at the entrances to departure lounges through which passengers are channeled, and that house the identification device and the monitoring device. In order to avoid passengers feeling oppressed in the lock chamber, the lock chamber is defined for the most part by walls that are transparent. Nevertheless, in such an application, the background and the lighting of the lock chamber are not under control, so monitoring devices of the above-mentioned type are difficult to use. In addition, the time taken to process the image is found to be relatively long.

OBJECT OF THE INVENTION

It would thus be advantageous to have means available making it possible in simple and reliable manner to analyze a presence in a space while limiting the influence of external constraints on the analysis.

BRIEF SUMMARY OF THE INVENTION

To this end, the invention provides a method of analyzing a presence in a space, the method comprising the steps of:

projecting at least one light beam into the space and towards a screen in such a manner that at least a portion of a body, if present in the space, casts a shadow onto the screen; and analyzing the shadow cast onto the screen.

Thus, the analysis does not relate to the body itself, but rather to the shadow it casts on a screen. In image processing, the image of a shadow on a screen is a binary image that is relatively easy to process. Analyzing the shadow of the body is thus simpler, more reliable, and faster than analyzing the body itself, and requires computer resources that are relatively limited. In addition, the light beam source and the screen can easily be arranged to avoid environmental constraints. The intensity and the wavelength of the light beam and the color of the screen can be selected so as to limit the influence of ambient lighting on the density of the shadow cast on the screen. The light beam source and the screen can be positioned in such a manner as to remain discreet (for example the light beam source may be disposed high up and the screen may be formed by the ground and/or by the bottoms of the walls defining the space) . . . .

Preferably, two light beams are projected towards the screen in directions that are not parallel.

If two bodies are in alignment in the direction of the first light beam, then both bodies together might project a shadow on the screen that corresponds to the shadow cast by a single body. Nevertheless, since the two bodies are then not in alignment in the direction of the second light beam, they will still cause a shadow to appear on the screen that is representative of two bodies.

Advantageously, the light beam has a wavelength situated outside a visible range.

Thus, when the method is used for detecting the presence of an individual, it is possible to implement the method without the knowledge of the individual, who cannot see the light beam or the shadow cast on the screen.

Also advantageously, the analysis includes a stage of detecting gray levels in the shadow cast on the screen.

Finer analysis is thus obtained, in particular when two close-together bodies cast a single shadow on the screen.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

The method of the invention is described herein in application to a system for allowing access to premises by analyzing the presence of individuals.

Figure 1:
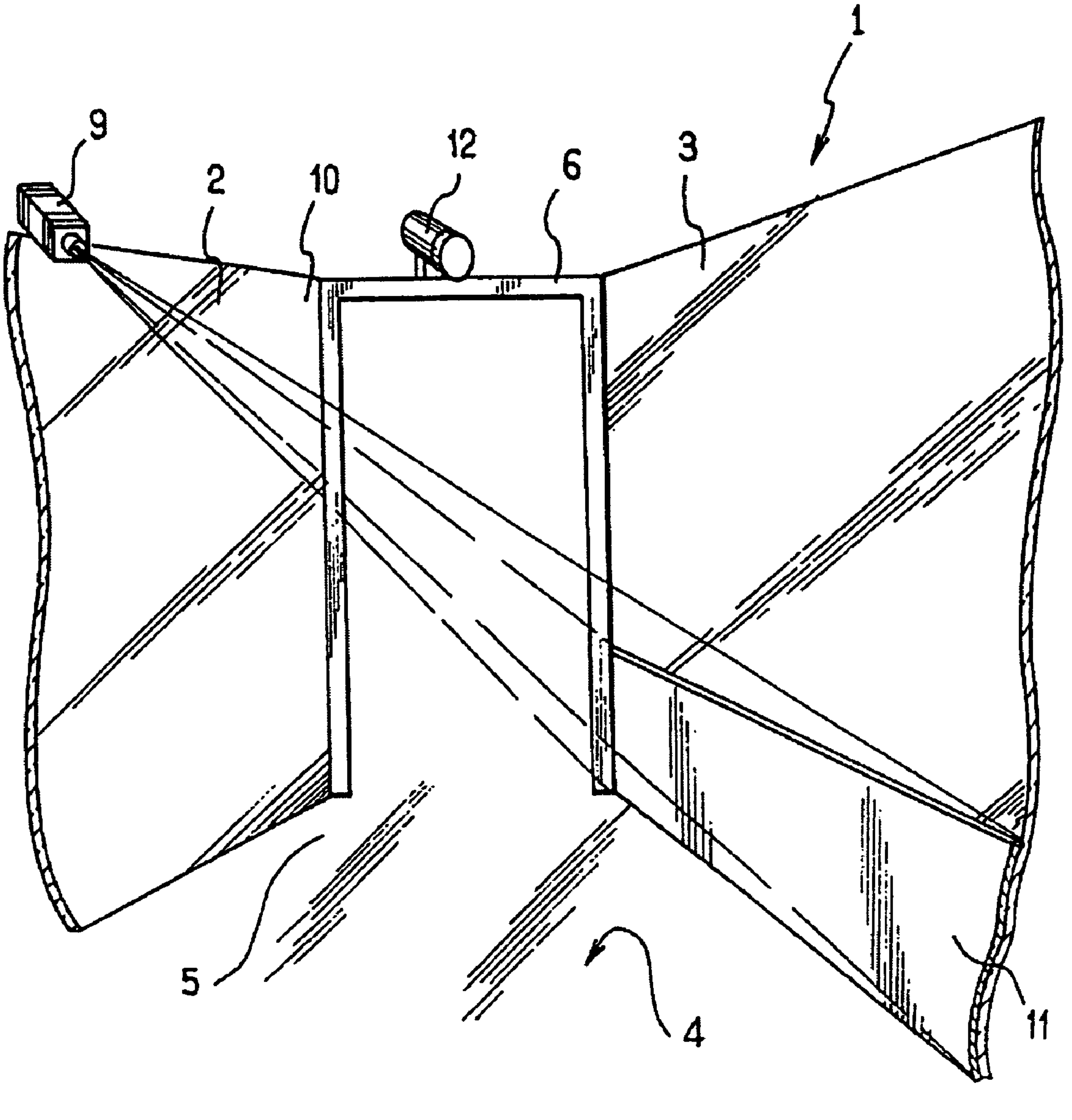
FIG. 1 is a fragmentary perspective view of an lock chamber in compliance with a first implementation of the method of the invention.
Figure 3:
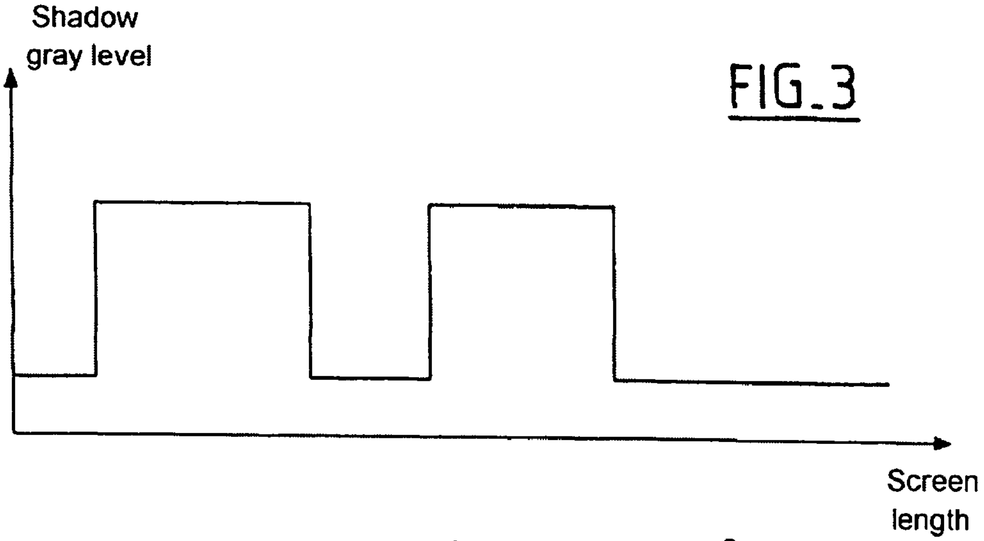
FIG. 3 is a diagram showing the gray levels of a shadow cast on the screen in the lock chamber.
Figure 2:
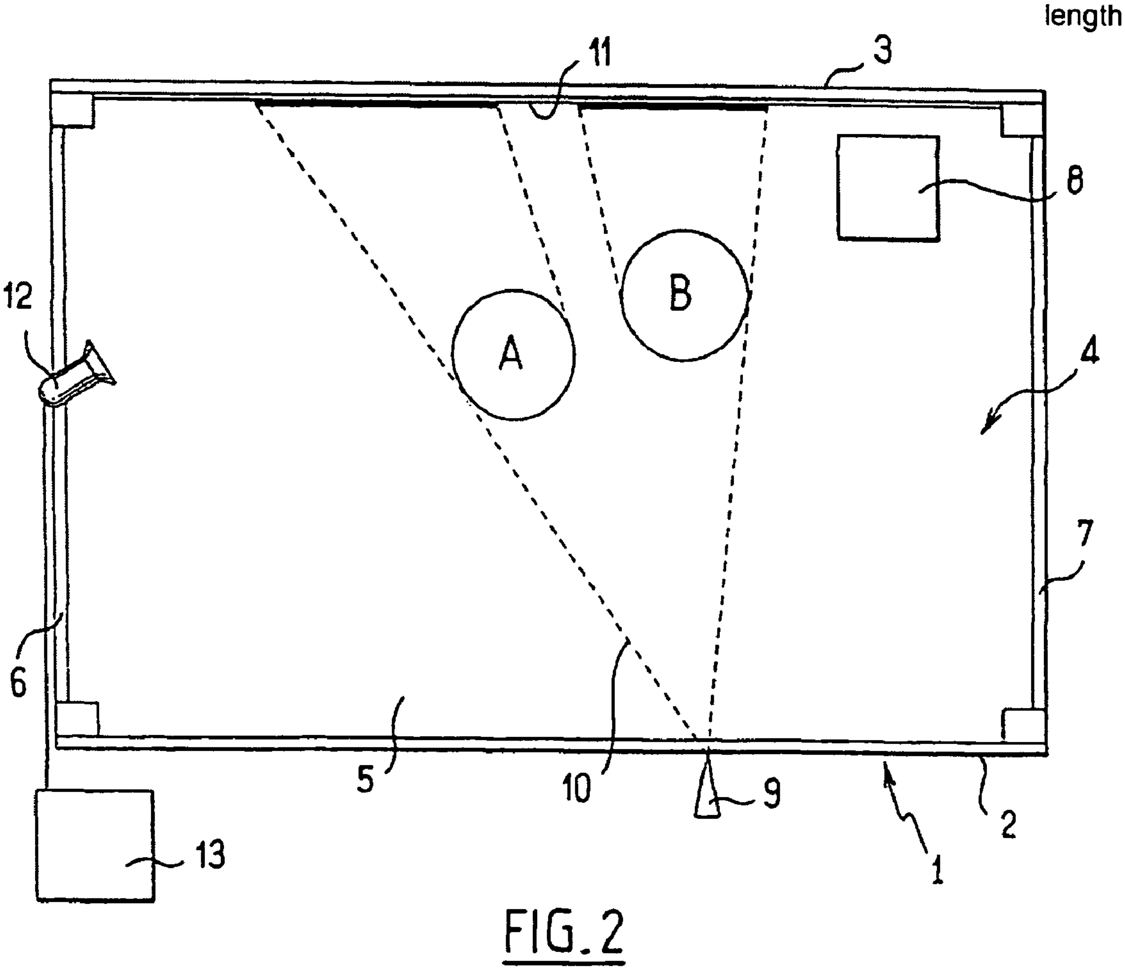
FIG. 2 is a diagrammatic plan view of the lock chamber.

With reference to FIGS. 1 to 3, in a first implementation of the invention, the access authorization system comprises an lock chamber given overall reference 1, having side walls 2, 3, extending vertically from the floor 4 to define a passage 5 having an entrance 6 and an exit 7 at its ends, both closed by respective doors. The lock chamber 1 houses an identifier device 8 that operates, for example, by recognizing fingerprints or irises and that is not described in detail in the present description since it is itself known.

The lock chamber 1 is fitted with a light source 9 at a fixed height on the side wall 2 for emitting a light beam 10 into the passage 5 towards a screen 11 formed on a bottom portion of the side wall 3. The light source 9 is arranged to produce a light beam 10 such that if an individual passes between the light source 9 and the screen 11, at least a portion of the individual casts a shadow onto the screen 11. The screen is selected in particular to match the lighting so that the shadow cast onto the screen can clearly be seen thereon. The light beam 10 in this example has a wavelength lying in the infrared spectrum and the screen 11 is an opaque surface of uniform color, specifically white.

The lock chamber 1 is fitted with a camera 12 fastened to the lock chamber, in this example above the entrance 6, in order to provide images of the screen 11. The camera 12 is connected to an image processor unit 13 that is itself known and that is suitable for distinguishing gray levels in the images provided by the camera 12.

By way of example, when two individuals A and B are in the light beam 10, they cast two shadows on the screen 11, which shadows are clearly distinguished on a white zone (the gray levels are shown diagrammatically in FIG. 3). It can be observed that since the screen 11 possesses known characteristics (given the screen 11 is selected by the user), its contribution to the signal is known and can be ignored or used as a reference, with the variations in the signals that do not result from such a contribution from the screen being the result of a shadow cast onto the screen. It is thus possible to analyze a presence in the space 5 using a single image.

When a plurality of individuals are detected, the processor unit 13 emits a warning signal to warn an operator to come and see that individuals are present and request an explanation from them.

In the description below, elements that are identical or analogous to those described above are given identical reference numerals.

Figure 5:
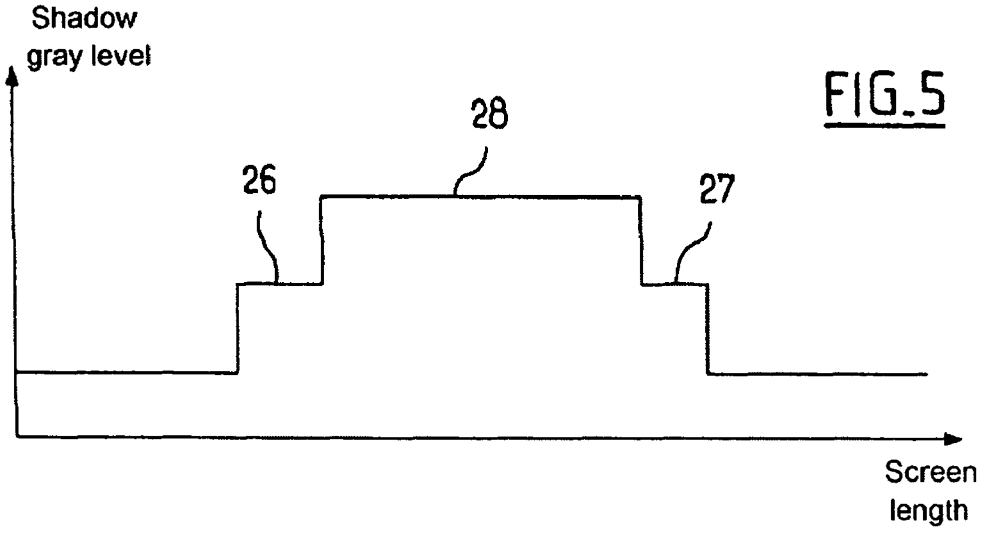
FIG. 5 is a diagram showing the gray levels of a shadow cast on the screen.
Figure 4:
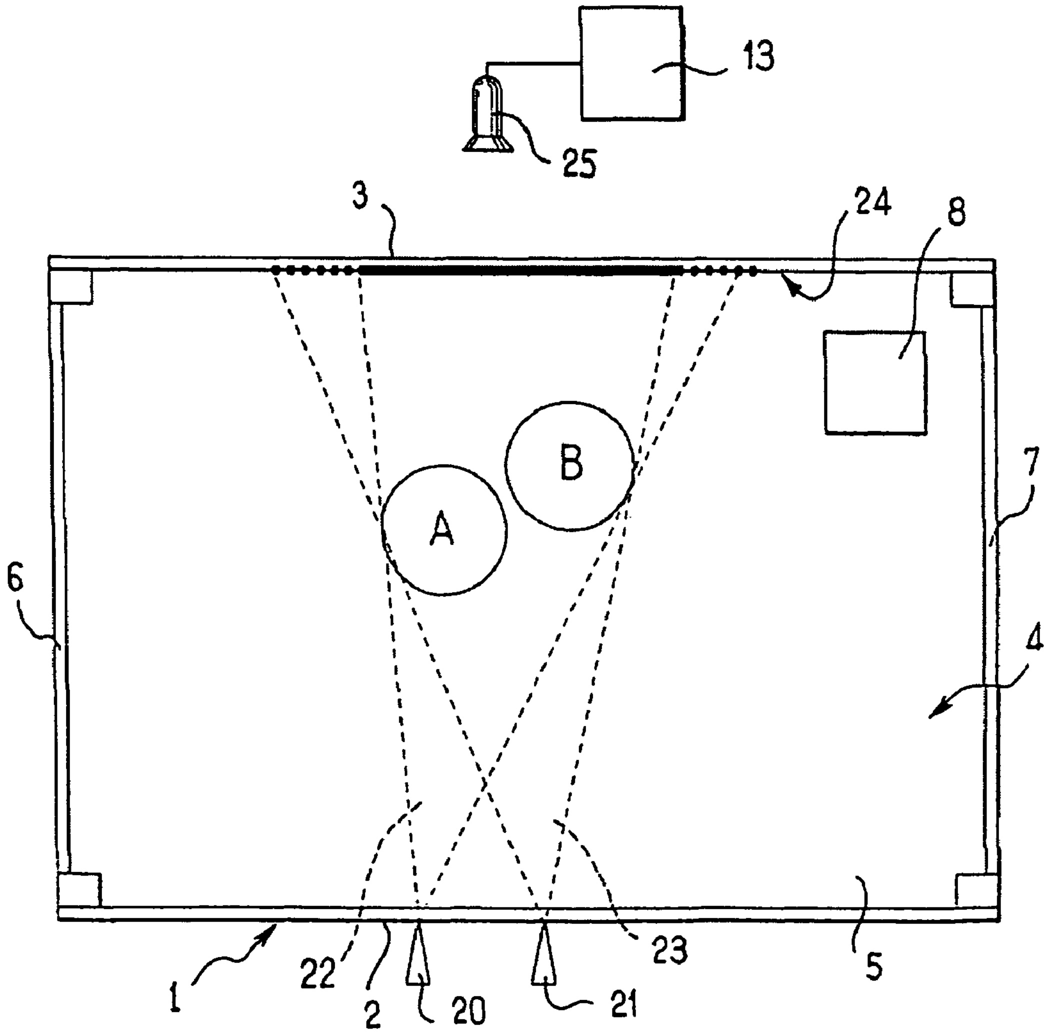
FIG. 4 is a diagrammatic plan view of an lock chamber in compliance with a second embodiment of the invention.

With reference to FIGS. 4 and 5, the access authorization system in compliance with the second implementation comprises an lock chamber 1 identical to that of the first embodiment.

Nevertheless, the lock chamber 1 in this embodiment is fitted with two light sources 20, 21 arranged to project two light beams 22, 23 into the passage 5 towards a screen 24 in directions that are not parallel. The beams could alternatively be parallel but offset in three dimensions.

The screen 24 is positioned in the lock chamber 1 as in the first implementation. The screen 24 in the second implementation is a translucent screen, and a camera 25 is placed on a side of the screen 24 that is opposite from the light sources 20, 21.

By way of example, when two individuals A and B are in the light beams 22, 23, they cast a single shadow onto the screen 24 that can clearly be distinguished on the screen 24. The camera 25 then supplies the processor unit 13 with at least one image on which the processor unit 13 can detect two zones of mid-gray levels 26, 27 (corresponding to the shadow resulting from only one of the light beams 22, 23 being obstructed) on either side of a broad zone of dark gray level 28 (corresponding to shadows resulting from obstruction of the light beams 22, 23 being superposed), which can be distinguished from a white zone (the gray levels are shown diagrammatically in FIG. 5).

If a single individual is located in the light beams 22, 23, then a single shadow is cast onto the screen 24 that can be distinguished clearly on the screen 24. The image provided by the camera 25 then has two zones of mid-gray (corresponding to the shadow resulting from obstructing only one of the light beams 22, 23) on either side of a zone of dark gray that is relatively narrow (corresponding to a superposition of shadows resulting from obstructing both light beams 22, 23), all distinguishable from a white zone.

With two light beams, the presence of a plurality of individuals is deduced from the widths of the various gray zones.

As before, when a plurality of individuals are detected, the processor unit 13 issues a warning signal to warn an operator to come and observe the presence of the individuals and ask them for an explanation.

Naturally, the invention is not limited to the implementation described and variants can be made thereto without going beyond the ambit of the invention as defined by the claims.

In particular, the number of light sources may be greater than two and/or a light source may be movable for the purpose of scanning the space to be monitored. The light source may be arranged to emit a light beam of spectrum that is situated in the visible domain or that lies outside it.

The light source may comprise a flash operated synchronously with a picture-taking device.

The screen may be a surface that is opaque or translucent, plane or curved, continuous or made up of spaced-apart vertical strips (so that the camera can see the shadow cast on the screen while having its optical axis perpendicular to the screen). The shadow may be analyzed from the side of the screen that is illuminated, or, for example when the screen is translucent, the shadow may be analyzed from a side of the screen opposite from the light beam source. The screen may be formed by a portion of the floor or of the ceiling and/or by a bottom portion of an adjacent wall.

The analysis can be carried out on one or more images.

Applications other than those described can also be envisaged, and for example detecting articles abandoned on the ground by means of a grazing light beam projecting a shadow of an article onto a screen disposed level with the ground.

The invention claimed is:

1. A method of analyzing a presence of at least one body in a space, the method comprising the steps of:

projecting at least one light beam into the space and towards a screen in such a manner that at least a portion of a body, if present in the space, casts a shadow onto the screen; and analyzing the shadow cast onto the screen, the analysis including a stage of detecting gray levels in the shadow cast on the screen in order to detect a plurality of bodies being present in the space;

wherein the detection is designed to prevent unauthorized individuals from passing through a lock chamber.

2. The method according to claim 1, wherein two light beams are projected towards the screen in directions that are not parallel.

3. The method according to claim 1, wherein the light beam has a wavelength situated outside a visible range.

4. The method according to claim 3, wherein the wavelength lies in the infrared spectrum.

5. The method according to claim 1, wherein the light beam has a wavelength and the screen has color which is selected to limit an influence of ambient lighting on a density of the shadow cast on the screen.

* * * * *